United States Patent [19]

Blount

[11] Patent Number: 4,585,191
[45] Date of Patent: Apr. 29, 1986

[54] PROPULSION APPARATUS AND METHOD USING BOIL-OFF GAS FROM A CRYOGENIC LIQUID

[75] Inventor: Dale H. Blount, Huntsville, Ala.

[73] Assignee: The United States of America as represented by the Administrator of the National Aeronautics and Space Administration, Washington, D.C.

[21] Appl. No.: 561,432

[22] Filed: Dec. 14, 1983

[51] Int. Cl.$^4$ .............................................. B64G 1/26
[52] U.S. Cl. ................................ 244/169; 244/158 R; 60/203.1; 60/39.465
[58] Field of Search ............. 244/169, 172, 62, 158 R, 244/98, 173; 60/39.12, 39.48, 203.1, 39.461, 39.465

[56] References Cited

U.S. PATENT DOCUMENTS

| | | | |
|---|---|---|---|
| T100,604 | 5/1981 | Crill et al. ..................... | 244/158.009 |
| 1,035,560 | 8/1912 | Erdman ................................. | 244/98 |
| 2,835,548 | 5/1958 | Baumann ....................... | 244/158 R |
| 2,974,594 | 3/1961 | Boehm .............................. | 244/169 |
| 2,984,978 | 5/1961 | Griffith .......................... | 60/39.465 |
| 3,092,972 | 6/1963 | Poorman et al. ............... | 244/135 R |
| 3,097,480 | 6/1963 | John .................................. | 244/172 |
| 3,147,593 | 9/1964 | Garrett ............................. | 60/39.465 |
| 3,270,985 | 9/1966 | Schmidt .............................. | 244/169 |
| 3,339,863 | 9/1967 | Webb ................................ | 244/173 |
| 3,426,545 | 2/1969 | Lloyd ............................... | 60/203.1 |
| 3,473,343 | 10/1969 | Chamberlain ..................... | 60/39.48 |
| 3,532,297 | 10/1970 | Maes ................................ | 244/169 |
| 3,532,299 | 10/1970 | Williams et al. ................... | 244/173 |
| 3,724,215 | 4/1973 | Neudecker ........................ | 60/203.1 |

*Primary Examiner*—Galen L. Barefoot
*Attorney, Agent, or Firm*—Joseph H. Beumer; John R. Manning; Leon D. Wofford, Jr.

[57] ABSTRACT

A propulsion system and method is disclosed for controlling the attitude and drag of a space vehicle (10). A helium dewar (12) contains liquid helium (11) which cools an experiment package (22). The helium is heated or vented to keep the temperature between 1.5 and 1.7 degrees K to maintain helium boil-off gas adequate as a propellant without adversely affecting the experiment package which is contained in the helium dewar for protection from solar heating. The apparatus includes auxiliary heater (32) and temperature sensor (30) for controlling the temperature of the helium. The boil-off gas propellant is delivered to thruster modules (A) to control vehicle attitude and compensate for drag.

20 Claims, 4 Drawing Figures

PROPULSION APPARATUS AND METHOD USING BOIL-OFF GAS FROM A CRYOGENIC LIQUID

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTIOn

For various space vehicle maneuvers and experiments in space, particularly in low earth orbits, it is necessary to control the attitude and compensate for the drag on the vehicle while it is in orbit. In particular, these requirements are critical for experiments where telescopes and other viewing instruments are used and it is necessary to keep these instruments oriented in a precise direction.

This invention relates to a propulsion system which utilizes cryogenic helium, already on board the space vehicle for cooling an experiment package, for the additional purpose of meeting in-orbit propulsion requirements of the vehicle.

Accordingly, an important object of the present invention is to provide a propulsion system for a space vehicle utilizing boil-off gas of the on-board supply of liquid helium as a propellant without adversely affecting the temperature of the experiment package which is being cooled by the helium.

Still another important object of the present invention is to provide a simplified propulsion system which has few components and which utilizes components already existing on a space vehicle.

SUMMARY OF THE INVENTION

In the present invention, boil-off gas from a cryogenic liquid container or a space vehicle is employed to provide the propulsive forces necessary for controlling the attitude of the vehicle and compensating for drag in low earth orbit. The apparatus and method are useful for a space vehicle of the type having an experiment package and a helium dewar for cooling and maintaining the experiment package at a desired temperature. The dewar is vented to enable release of boil-off gas due to the heating of the dewar by solar radiation leaked to the dewar. The vehicle includes a dewar support frame having a support ring manifold from which a plurality of solar-panel-supporting spars extend radially. The above objectives are accomplished according to the present invention by providing thruster modules carried adjacent ends of the solar panel spars for producing a thrust force in a desired direction. An auxiliary heater is operatively connected with the dewar for increasing the amount of helium boil-off gas produced in the dewar to provide an amount of boil-off gas which is adequate as a propellant for controlling the attitude and drag when the boil-off gas due to heat leak is inadequate. A temperature sensor and controller are provided for sensing the temperature of the dewar and actuating the auxiliary heater to maintain the supply of helium boil-off gas adequate as a propellant. A supply line for delivering the boil-off gas is connected to the thrust modules. Distribution control valves are provided for selectively delivering boil-off gas to a desired thrust module and thereby controlling the attitude and drag on the vehicle.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
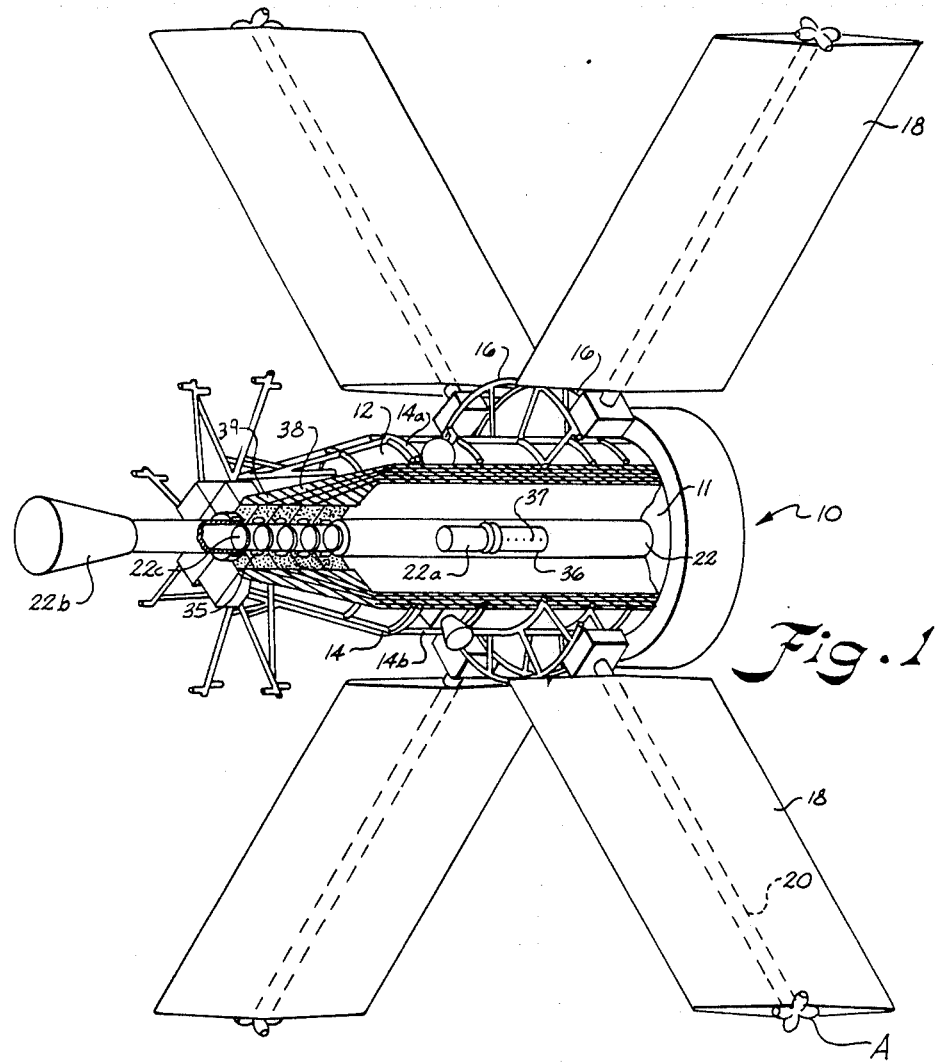
FIG. 1 is a perspective, partially cut-away view illustrating a space vehicle propulsion system utilizing helium boil-off gas from an experiment package helium dewar according to the invention.

Referring now to the drawings, a vehicle 10 is illustrated in FIG. 1 for a space experiment in a low earth orbit. Liquid helium 11 is contained in a dewar 12 which comprises a major portion of the spacecraft. The dewar is supported by an aluminum framework 14 which includes frame ring members 14a and longitudinal frame members 14b on the outside of the dewar and attached thereto. Hollow annular support rings 16 are interconnected to form a manifold and are spaced from and carried about the dewar support structure for supporting solar array panels 18. The solar array panels are carried on hollow spars 20 which in turn are spaced around and carried by the support ring manifold. An experiment package 22 in the helium dewar is kept cool by the helium which is pressurized and at a temperature of about 1.6 degrees K. The package may include, for example, a telescope 22a which receives light through a shield 22b and instrument windows 22c.

Figure 3:
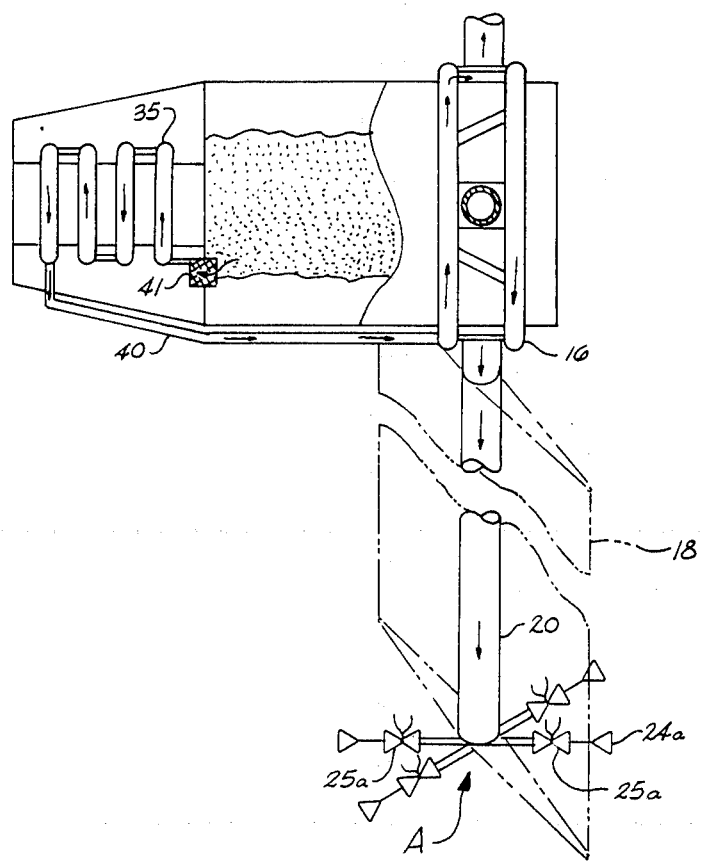
FIG. 3 is an elevation, partially cut away, illustrating a helium distribution system according to the invention.
Figure 4:
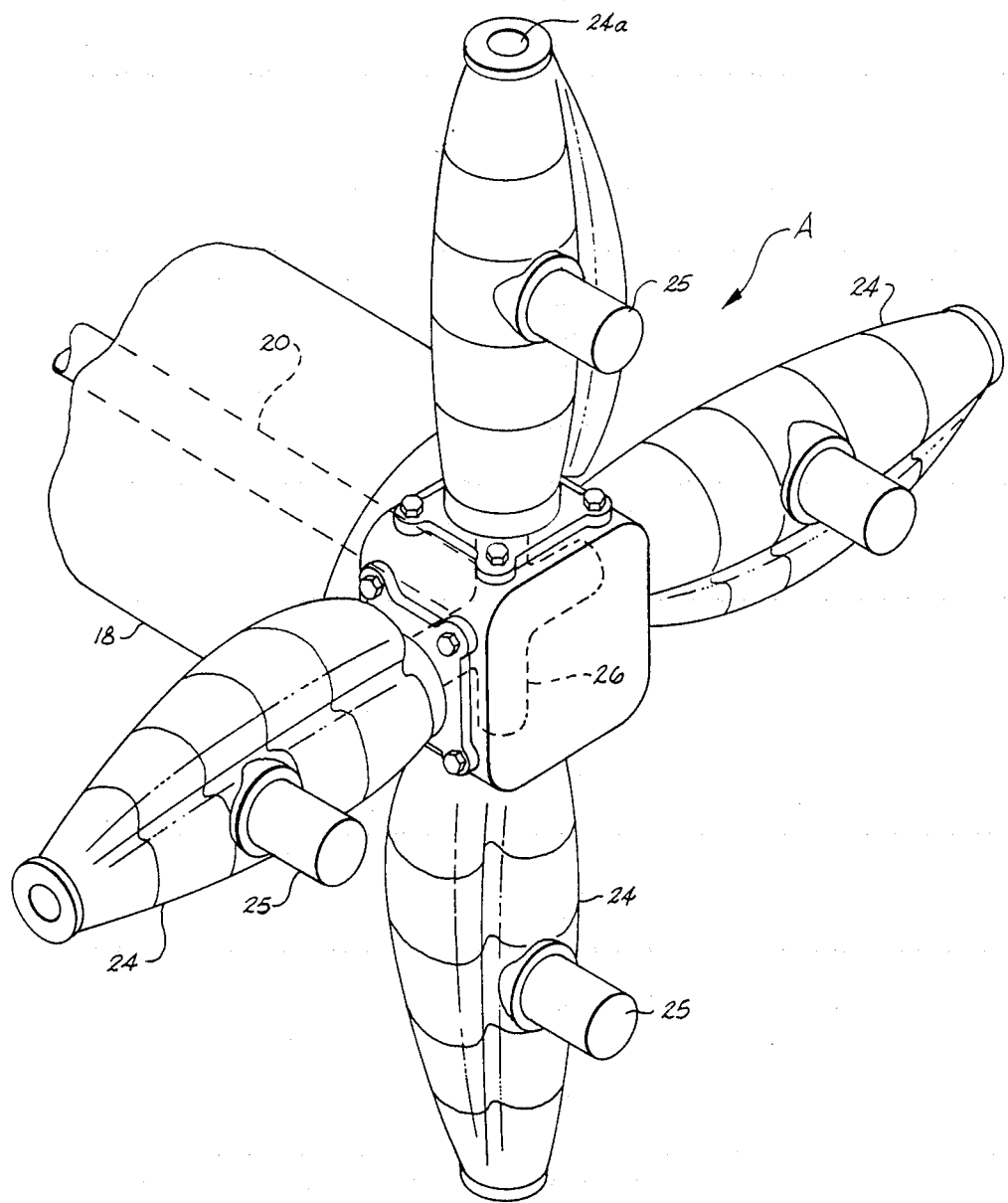
FIG. 4 is a thrust module for a helium boil-off gas propulsion system for controlling attitude and drag on a low earth orbit space vehicle according to the invention.

The dewar is encircled by a plurality of heat shields 38 interleaved with layers of insulation 39, which extend beyond one end of the dewar and taper inwardly over the instrument windows. The extended end portions of the heat shields are cooled by means of hollow, interconnected rings 35 (FIG. 3) through which helium is passed on its way to the thrusters. As illustrated, a supply line 40 leads from the heat cooling rings to the support ring manifold 16 which is constructed from tubular aluminum material and is hollow. The support ring manifold is used as a conduit for delivering the helium to the interior of the solar array spars 20 which then deliver the helium to the four-way manifold 26 (FIG. 4) of the thruster modules. In this manner, a supply of helium is delivered to the thrusters 24 utilizing, in part, the existing hardware.

Porous plug 41 in the dewar container acts as a phase separator, keeping in the liquid helium and allowing the vapor to escape. Solar heating of the dewar heat shields, lines, frame members, and spars raises the temperature of the helium gas significantly before it reaches the thrusters.

According to the present invention, a plurality of thrust modules, designated generally as A, (FIG. 4) are provided with one each of the thrust modules A carried on the ends of each solar array spar 20. Each thruster module includes four thrusters 24 which are arranged mutually perpendicular to each other. Each thruster 24 includes a valve motor 25 which remotely controls a motorized valve 25a (FIG. 2) inside the thruster which is variable so as to emit a variable amount of helium boil-off gas through the thruster. Any suitable throttling valve may be utilized. This allows precise control of the thrust produced by the boil-off gas emitted from the thruster. A four-way manifold 26 is included in each thruster which direct helium into the thrusters, when one of the valves is open and outwardly through the nozzle outlet 24a.

Figure 2:
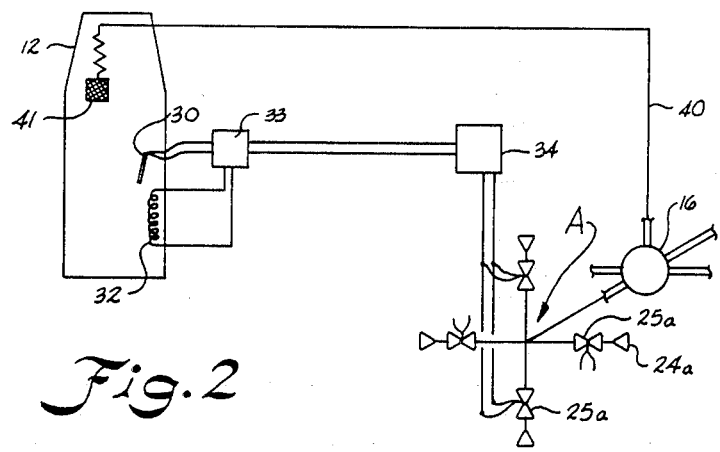
FIG. 2 is a schematic illustration of apparatus for utilizing boil-off gas from a helium dewar cooling container to control spacecraft attitude and drag according to the invention.

A temperature sensor 30 and temperature controller 33 are illustrated in FIG. 2 to sense and control the temperature of the helium 11 in the dewar. The helium sensor senses the temperature of the helium in the dewar and if the temperature of the helium increases beyond 1.7 degrees K., the helium is allowed to vent through two of the thrusters 24 which are arranged at one hundred-eighty degrees to each other so that the resultant thrust is zero. If the temperature of the helium in the dewar decreases below 1.5 K., an auxiliary heater 32 may be turned on to increase the temperature of the helium so that a sufficient supply of the helium boil-off gas is present for propulsion. Heater 32 need only be of about one watt since heat leak into the dewar from solar radiation is normally the main source of helium boil-off gas. It has been found for one experiment that the temperature of the helium may be kept between 1.5 and 1.7 degrees K. without adversely affecting experiment package conditions while providing adequate propellant for attitude and drag control.

Operation of the thrusters in the desired manner is regulated by means of a controller 34 (FIG. 2). The controller includes a conventional computer or microprocessor into which are programmed desired parameters derived from dynamic analysis of the system. The controller receives signals from temperature controller 33, along with signals from gyroscopes 36, indicative of attitude of the vehicle, and signals from proof mass 37, indicative of drag, which is related to displacement of the proof mass from the center of mass of the vehicle. Programmed values are then compared with values of the received signals, and a resulting signal is applied to turn on one or more of values 25 for a period sufficient to produce the necessary thrust. Various conventional software and hardware systems may be utilized to control the thrusters, as is well within the purview of one skilled in the art. Further detailed regarding theoretical aspects of thrust control in the above described system may be had by reference to a report, NASA TM-82517, January, 1983, by the present inventor, entitled "Attitude Control and Drag Compensation Propulsion System for the Gravity Probe-B Spacecraft," available from National Technical Information Service, Springfield, Va. 22161, which report is hereby incorporated by reference in its entirety.

While a preferred embodiment of the invention has been described using specific terms, such description is for illustrative purposes only, and it is to be understood that changes and variations may be made without departing from the spirit or scope of the following claims.

What is claimed is:

1. An attitude control propulsion apparatus for controlling the attitude of a vehicle orbiting in space comprising:
   a cryogenic liquid container adapted to be carried by a vehicle for containing a cryogenic liquid, said cryogenic liquid container having a vent means for boil-off of gas from said liquid due to external heat input;
   thruster means adapted to be carried by said vehicle for producing thrust forces in a desired direction;
   a supply line for delivering said boil-off gas from said vent means to said thruster means;
   temperature control means for controlling the temperature of said cryogenic liquid within prescribed upper and lower limits so that adequate propellant is provided by said boil-off gas for producing said desired thrust forces; and for maintaining a coolant temperature of an experiment package cooled by said cryogenic temperature; and means for controlling said thruster means.

2. A propulsion apparatus as set forth in claim 1 wherein said vehicle is a space vehicle.

3. A propulsion apparatus as set forth in claim 2 wherein said temperature control means comprises:
   a heater operatively connected to said cryogenic liquid container for providing additional heat input adequate to produce the amount of boil-off gas needed for said thruster means;
   temperature sensor means for sensing the temperature of the cryogenic liquid within said container and producing a temperature signal; and
   control means responsive to said temperature signal for controlling said heater to provide additional heat input as needed.

4. A propulsion apparatus as set forth in claim 3 further comprising:
   a plurality of said thruster means; and wherein said means for controlling said thruster means include valve means for each of said thruster means.

5. A propulsion apparatus as set forth in claim 4 wherein:
   each said thruster means includes four thruster units.

6. A propulsion apparatus as set forth in claim 5 wherein:
   each of said thruster means has two of said thruster units carried in opposed thrust directions along an axis and the other two of said thruster units carried in opposed thrust directions along an axis perpendicular to said first-mentioned axis.

7. A propulsion apparatus as set forth in claim 6 wherein said valve means is adequate to optionally vent units simultaneously to produce a resultant thrust force of zero while venting said gas.

8. A propulsion apparatus as set forth in claim 1 including a controller responsive to the attitude of said vehicle, the drag on said vehicle and the temperature of the cryogenic liquid in said container to provide boil-off gas as is required for attitude, drag and temperature control, respectively.

9. A propulsion apparatus for controlling the attitude and compensating for the drag of a space vehicle in a low earth orbit, said space vehicle being of the type having a dewar for storing helium which is utilized for cooling an experiment package on board said vehicle at a desired temperature, and a dewar support frame structure which includes hollow tubular frame elements, said apparatus comprising:

thruster means carried by said vehicle for directing thrust forces in predetermined directions;

vent means for releasing from said dewar helium boil-off gases created by heat leak into said dewar from solar radiation;

control means for controlling the amount of helium released from said dewar by controlling the temperature of said helium in a range sufficient to maintain said experiment package adequately cooled while maintaining an amount of boil-off gas which is sufficient as a propellant to produce thrust forces to control the attitude and drag of said space vehicle; and distribution means for selectively distributing said helium boil-off gas through aid thruster means to produce a desired thrust force for controlling the attitude and drag on said space vehicle.

10. A propulsion apparatus as set forth in claim 9 wherein said control means includes:

heater means for directly increasing the temperature of said liquid helium; and sensor means for controlling said heater means so as to maintain the temperature of said liquid helium in said range.

11. A propulsion apparatus as set forth in claim 10 wherein said space vehicle is of the type having a plurality of hollow spars carried radially extending by said vehicle, and wherein said thruster means includes:

a thruster module carried on the end of each said spar including a plurality of thrusters for directing a thrust force in opposite directions along two mutually perpendicular axes.

12. The apparatus of claim 11 wherein each thrust module includes four thruster units, two each of said thruster units being arranged along said mutually perpendicular axes in opposite directions and valve means for selectively delivering boil-off gas propellant through a desired thruster unit.

13. The apparatus of claim 12 wherein said space vehicle has a support ring manifold for carrying said spars thereon, said distribution means including a hollow interior in said support ring manifold and said spars through which said boil-off gas is delivered to each said thruster module, and a supply line connected to said vent means and said support ring manifold.

14. The apparatus of claim 13 including a thrust controller means for sensing the attitude of said vehicle and the drag on said vehicle and controlling the distribution of helium boil-off gas propellant to an appropriate thruster means to correct said attitude and compensate for said drag.

15. The apparatus of claim 14 wherein said thrust controller means is responsive to an upper temperature limit of said dewar to distribute boil-off gas to said two thruster units arranged along an axis in opposite directions to vent said boil-off gas while producing a net zero thrust force.

16. A method of controlling the attitude and compensating for drag in a low earth orbit of a space vehicle of the type having a dewar in which pressurized liquid helium is stored at a desired temperature for cooling an experiment package within said dewar, said method comprising:

storing said helium in said dewar at a predetermined temperature range below and above said desired temperature required for cooling said experiment package to provide an adequate amount of helium boil-off gas for a propellant to control the attitude and compensate for drag in a low earth orbit without adversely affecting the temperature of said experiment package;

arranging a plurality of thrusters on said space vehicle for controlling the attitude of said vehicle and compensating for drag;

distributing said helium boil-off gas to said thrusters as necessary to control the attitude and compensate for the drag on said space vehicle while maintaining said temperature of said liquid helium within a desired temperature so that said experiment package is not adversely affected;

sensing the temperature of said dewar; and controlling a heat input in response to said sensed temperature of said dewar to add heat when additional boil-off gas is needed and to maintain a cooling temperature of said dewar so that the temperature of said experiment packages does not exceed a prescribed limit.

17. The method of claim 16 including controlling the temperature of said helium stored in said dewar by providing an auxiliary heater to directly control the temperature of said helium.

18. The method of claim 17 including sensing the temperature of said helium and controlling the temperature of said helium in said predetermined range accordingly to provide said adequate amount of helium boil-off gas.

19. The method of claim 18 including venting said boil-off gases as necessary to maintain the temperature of said helium within the upper limit of said predetermined temperature range.

20. The method of claim 19 including sensing the attitude and drag of said vehicle and controlling said thruster in response to the sensed values thereby obtained.

* * * * *